United States Patent
Paynter

(10) Patent No.: US 9,472,928 B2
(45) Date of Patent: *Oct. 18, 2016

(54) COAXIAL CABLE AND CONNECTOR WITH TUNED CAPACITIVE COUPLING

(71) Applicant: CommScope Technologies LLC, Hickory, NC (US)

(72) Inventor: Jeffrey D. Paynter, Momence, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/799,050

(22) Filed: Jul. 14, 2015

(65) Prior Publication Data

US 2016/0020534 A1    Jan. 21, 2016

Related U.S. Application Data

(60) Provisional application No. 62/024,654, filed on Jul. 15, 2014.

(51) Int. Cl.
| H01R 24/40 | (2011.01) |
| H01R 9/05  | (2006.01) |
| H02G 1/14  | (2006.01) |
| H01F 38/14 | (2006.01) |

(52) U.S. Cl.
CPC ............... *H02G 1/14* (2013.01); *H01F 38/14* (2013.01); *H01F 2038/146* (2013.01)

(58) Field of Classification Search
CPC .. H01R 24/40; H01R 24/38; H01R 2103/00; H01R 9/05; H01R 9/0503; H01R 24/44
USPC ................................ 439/578–585; 333/24 C
See application file for complete search history.

(56) References Cited

U.S. PATENT DOCUMENTS

| 7,497,729 B1 | 3/2009 | Wei |
| 7,806,724 B2 | 10/2010 | Paynter et al. |
| 2002/0030329 A1* | 3/2002 | Montena ............... H01R 9/0521 280/1 |
| 2007/0187133 A1* | 8/2007 | Amato ............... H01B 11/1895 174/117 F |
| 2008/0170346 A1 | 7/2008 | Van Swearingen |
| 2009/0009271 A1 | 1/2009 | McKay |
| 2010/0007441 A1 | 1/2010 | Yagisawa et al. |
| 2010/0273349 A1 | 10/2010 | Chen |
| 2011/0256760 A1 | 10/2011 | Igarashi et al. |
| 2013/0065415 A1 | 3/2013 | Van Swearingen et al. |
| 2013/0100571 A1 | 4/2013 | Alkan et al. |

* cited by examiner

*Primary Examiner* — Gary Paumen
(74) *Attorney, Agent, or Firm* — Myers Bigel & Sibley

(57) ABSTRACT

A coaxial connector junction includes first and second coaxial connectors. The first coaxial connector engages the second coaxial connector, a substantially cylindrical member of a first central conductor extension of the first connector being inserted into the cavity of a second central conductor extension of the second connector, and a second outer conductor extension of the second connector being inserted into a first outer conductor extension of the first connector such that a capacitive element is created between the first and second outer conductor extensions by a gap between the first outer conductor extension and the second outer conductor extension. At least one of a length of the gap, an inner diameter of the second outer conductor extension, a thickness and dielectric constant of the capacitive element is selected such that the return loss of the junction is maintained below a preselected level over a preselected frequency range.

22 Claims, 8 Drawing Sheets

COAXIAL CABLE AND CONNECTOR WITH TUNED CAPACITIVE COUPLING

RELATED APPLICATION

The present application claims priority from and the benefit of U.S. Provisional Patent Application No. 62/024,654, filed Jul. 15, 2014, the disclosure of which is hereby incorporated herein in its entirety.

FIELD OF THE INVENTION

The present invention is directed generally to electrical cable connectors, and more particularly to coaxial connectors for electrical cable.

BACKGROUND

Coaxial cables are commonly utilized in RF communications systems. A typical coaxial cable includes an inner conductor, an outer conductor, a dielectric layer that separates the inner and outer conductors, and a jacket that covers the outer conductor. Coaxial cable connectors may be applied to terminate coaxial cables, for example, in communication systems requiring a high level of precision and reliability.

Coaxial connector interfaces provide a connect/disconnect functionality between (a) a cable terminated with a connector bearing the desired connector interface and (b) a corresponding connector with a mating connector interface mounted on an electronic apparatus or on another cable. Typically, one connector will include a structure such as a pin or post connected to an inner conductor of the coaxial cable and an outer conductor connector body connected to the outer conductor of the coaxial cable these are mated with a mating sleeve (for the pin or post of the inner conductor) and another outer conductor connector body of a second connector. Coaxial connector interfaces often utilize a threaded coupling nut or other retainer that draws the connector interface pair into secure electro-mechanical engagement when the coupling nut (which is captured by one of the connectors) is threaded onto the other connector.

Passive Intermodulation Distortion (PIM) is a form of electrical interference/signal transmission degradation that may occur with less than symmetrical interconnections and/or as electro-mechanical interconnections shift or degrade over time. Interconnections may shift due to mechanical stress, vibration, thermal cycling, and/or material degradation. PIM can be an important interconnection quality characteristic, as PIM generated by a single low quality interconnection may degrade the electrical performance of an entire RF system. Thus, the reduction of PIM via connector design is typically desirable.

SUMMARY

As a first aspect, embodiments of the invention are directed to a coaxial connector junction. The coaxial connector junction comprises a first coaxial connector and a second coaxial connector. The first coaxial connector comprises: a first central conductor extension comprising a substantially cylindrical member; a first outer conductor extension spaced apart from and circumferentially surrounding the first central conductor extension; and a first dielectric spacer interposed between the first central conductor extension and the first outer conductor extension. The second coaxial connector comprises: a second central conductor extension, the second central conductor extension including a substantially cylindrical cavity therein; a second outer conductor extension spaced apart from and circumferentially surrounding the second central conductor extension; and a second dielectric spacer interposed between the second central conductor extension and the second outer conductor extension. The first coaxial connector engages the second coaxial connector, the substantially cylindrical member of the first central conductor extension being inserted into the cavity of the second central conductor extension, and the second outer conductor extension being inserted into the first outer conductor extension such that a capacitive element is created between the first and second outer conductor extensions by a gap between the first outer conductor extension and the second outer conductor extension. At least one of a length of the gap, an inner diameter of the second outer conductor extension, a thickness of the capacitive element, and the dielectric constant of the capacitive element is selected such that the return loss of the connector junction is maintained below a preselected level over a preselected frequency range.

As a second aspect, embodiments of the invention are directed to a method of improving the return loss of a coaxial connector junction, comprising the steps of: (a) providing first and second coaxial connectors, the first coaxial connector comprising:
 (i) a first central conductor extension comprising a substantially cylindrical member;
 (ii) a first outer conductor extension spaced apart from and circumferentially surrounding the first central conductor extension; and
 (iii) a first dielectric spacer interposed between the first central conductor extension and the first outer conductor extension; and
the second coaxial connector comprising:
 (iv) a second central conductor extension, the second central conductor extension including a substantially cylindrical cavity therein;
 (v) a second outer conductor extension spaced apart from and circumferentially surrounding the second central conductor extension; and
 (vi) a second dielectric spacer interposed between the second central conductor extension and the second outer conductor extension;
wherein the first coaxial connector engages the second coaxial connector, the substantially cylindrical member of the first central conductor extension being inserted into the cavity of the second central conductor extension, and the second outer conductor extension being inserted into the first outer conductor extension such that a capacitive element is created between the first and second outer conductor extensions by a gap between the first outer conductor extension and the second outer conductor extension; and (b) adjusting at least one of a length of the gap, an inner diameter of the second outer conductor extension, a thickness of the capacitive element, and the dielectric constant of the capacitive element such that the return loss of the connector junction is maintained below a preselected level over a preselected frequency range.

As a third aspect, embodiments of the invention are directed to a coaxial connector junction comprising a first coaxial connector and a second coaxial connector. The first coaxial connector comprises: a first central conductor extension comprising a substantially cylindrical member; a first outer conductor extension spaced apart from and circumferentially surrounding the first central conductor extension;

and a first dielectric spacer interposed between the first central conductor extension and the first outer conductor extension. The second coaxial connector comprises: a second central conductor extension, the second central conductor extension including a substantially cylindrical cavity therein; a second outer conductor extension spaced apart from and circumferentially surrounding the second central conductor extension; and a second dielectric spacer interposed between the second central conductor extension and the second outer conductor extension. The first coaxial connector engages the second coaxial connector, the substantially cylindrical member of the first central conductor extension being inserted into the cavity of the second central conductor extension, and the second outer conductor extension being inserted into the first outer conductor extension such that a capacitive element is created between the first and second central conductor extensions by a gap between the first central conductor extension and the second central conductor extension. At least one of a length of the gap, an inner diameter of the second central conductor extension, a thickness of the capacitive element, and the dielectric constant of the capacitive element is selected such that the return loss of the connector junction is maintained below a preselected level over a preselected frequency range.

As a fourth aspect, embodiments of the invention are directed to a method of improving the return loss of a coaxial connector junction, comprising the steps of: (a) providing first and second coaxial connectors, the first coaxial connector comprising:
  (i) a first central conductor extension comprising a substantially cylindrical member;
  (ii) a first outer conductor extension spaced apart from and circumferentially surrounding the first central conductor extension; and
  (iii) a first dielectric spacer interposed between the first central conductor extension and the first outer conductor extension; and the second coaxial connector comprising:
  (iv) a second central conductor extension, the second central conductor extension including a substantially cylindrical cavity therein;
  (v) a second outer conductor extension spaced apart from and circumferentially surrounding the second central conductor extension; and
  (vi) a second dielectric spacer interposed between the second central conductor extension and the second outer conductor extension;
  wherein the first coaxial connector engages the second coaxial connector, the substantially cylindrical member of the first central conductor extension being inserted into the cavity of the second central conductor extension, and the second outer conductor extension being inserted into the first outer conductor extension such that a capacitive element is created between the first and second central conductor extensions by a gap between the first central conductor extension and the second central conductor extension; and (b) adjusting at least one of a length of the gap, an inner diameter of the second central conductor extension, a thickness of the capacitive element, and the dielectric constant of the capacitive element such that the return loss of the connector junction is maintained below a preselected level over a preselected frequency range.

As a fifth aspect, embodiments of the invention are directed to a coaxial connector junction, comprising a first coaxial connector and a second coaxial connector. The first coaxial connector comprises: a first central conductor extension comprising a substantially cylindrical member; a first outer conductor extension spaced apart from and circumferentially surrounding the first central conductor extension; and a first dielectric spacer interposed between the first central conductor extension and the first outer conductor extension. The second coaxial connector comprises: a second central conductor extension, the second central conductor extension including a substantially cylindrical cavity therein; a second outer conductor extension spaced apart from and circumferentially surrounding the second central conductor extension; and a second dielectric spacer interposed between the second central conductor extension and the second outer conductor extension. The first coaxial connector engages the second coaxial connector, the substantially cylindrical member of the first central conductor extension being inserted into the cavity of the second central conductor extension, and the second outer conductor extension being inserted into the first outer conductor extension such that a capacitive element is created between the first and second outer conductor extensions by a gap between the first outer conductor extension and the second outer conductor extension. The capacitive element in the gap comprises a dielectric layer applied on the second outer conductor extension. The second dielectric spacer includes a flange that extends radially outward toward to protect the dielectric layer of the capacitive element.

As a sixth aspect, embodiments of the invention are directed to a coaxial connector junction comprising a first coaxial connector and a second coaxial connector. The first coaxial connector comprises: a first central conductor extension comprising a substantially cylindrical member; a first outer conductor extension spaced apart from and circumferentially surrounding the first central conductor extension; and a first dielectric spacer interposed between the first central conductor extension and the first outer conductor extension. The second coaxial connector comprises: a second central conductor extension, the second central conductor extension including a substantially cylindrical cavity therein; a second outer conductor extension spaced apart from and circumferentially surrounding the second central conductor extension; and a second dielectric spacer interposed between the second central conductor extension and the second outer conductor extension. The first coaxial connector engages the second coaxial connector, the substantially cylindrical member of the first central conductor extension being inserted into the cavity of the second central conductor extension, and the second outer conductor extension being inserted into the first outer conductor extension such that a capacitive element is created between the first and second central conductor extensions by a gap between the first central conductor extension and the second central conductor extension. The capacitive element in the gap comprises a dielectric layer applied on the first central conductor extension. The first coaxial connector further comprises a dielectric cap mounted to a free end of the first central conductor extension, the dielectric cap includes a flange that extends radially outward toward to protect the dielectric layer of the capacitive element.

DETAILED DESCRIPTION OF EMBODIMENTS OF THE INVENTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
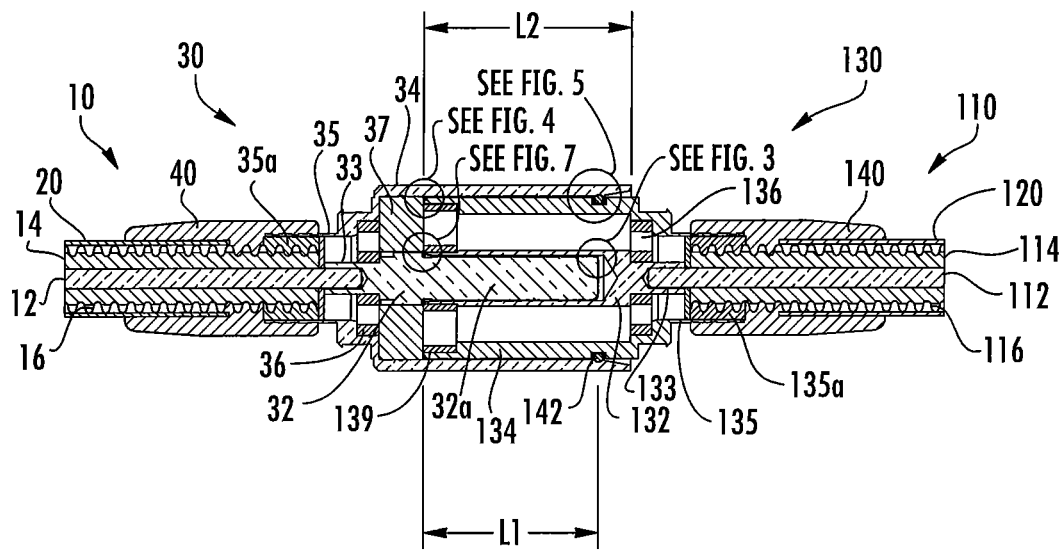
FIG. 1 is a partial cross-section of the coaxial cable-connector assembly according to embodiments of the invention, the assembly being shown in a mated condition.
Figure 2:
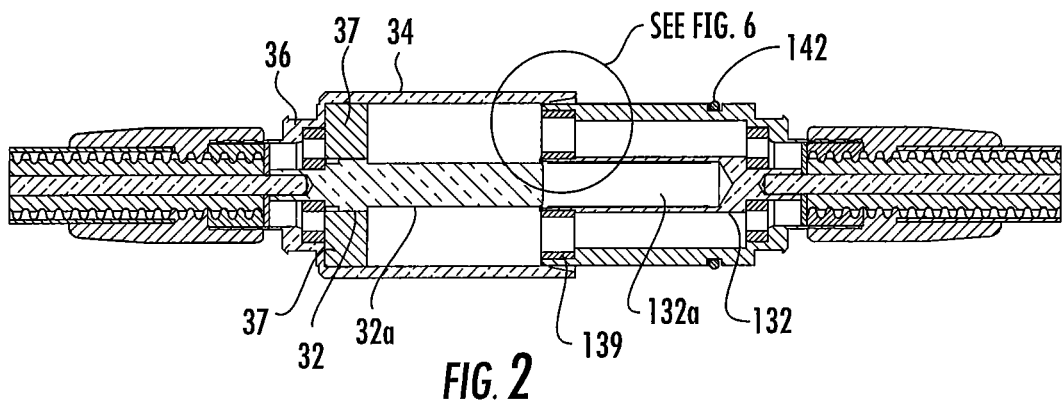
FIG. 2 is a partial cross-section of the coaxial cable-connector assembly of FIG. 1 shown in an unmated condition.

FIGS. 1 and 2 illustrate two coaxial cables, designated broadly at 10 and 110, according to embodiments of the present invention. The cable 10 includes a central conductor 12, a dielectric layer 14 that circumferentially overlies the central conductor 12, an outer conductor 16 that circumferentially overlies the dielectric layer 14, and a polymeric cable jacket 20 that circumferentially overlies the outer conductor 16. Similarly, the cable 110 includes a central conductor 112, a dielectric layer 114 that circumferentially overlies the central conductor 112, an outer conductor 116 that circumferentially overlies the dielectric layer 114, and a polymeric cable jacket 120 that circumferentially overlies the outer conductor 116. These components will be well-known to those of skill in this art and need not be described in detail herein. FIGS. 1 and 2 illustrate that the outer conductors 16, 116 may be of a corrugated profile; alternatively, the outer conductors 16, 116 may not have a corrugated profile. Both of these outer conductor configurations are known to those of skill in this art and need not be described in detail herein.

Referring again to FIGS. 1 and 2, the cable 10 includes a plug 30 that enables the cable 10 to be connected with a jack 130 of the mating coaxial cable 110. FIG. 1 shows the plug 30 and jack 130 in their mated condition; FIG. 2 shows the plug 30 and jack 130 in a largely unmated condition as the jack 130 is being inserted into the plug 30.

Figure 3:
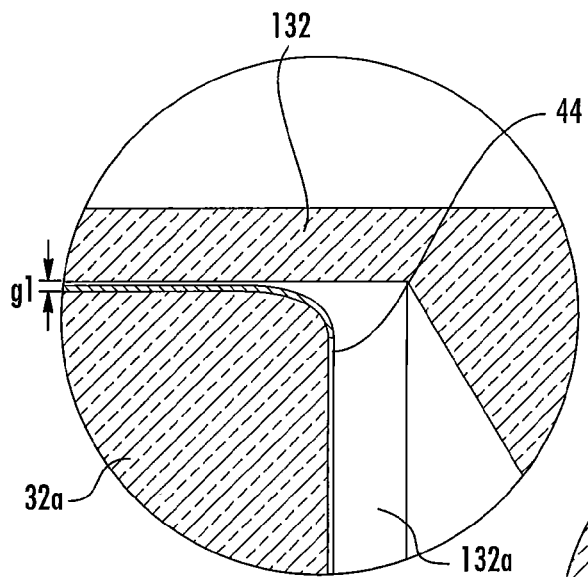
FIG. 3 is an enlarged partial section of the coaxial cable-connector assembly of FIG. 1.

The plug 30 includes a central conductor extension 32, an outer conductor extension 34 and an overmold body 40. The central conductor extension 32 has a generally cylindrical post 32a and is mounted on and is in electrical contact with the central conductor 12 of the cable 10 via a boss 33. As can be seen in FIG. 3, the post 32a has rounded edges at its free end. The outer conductor extension 34 is mounted in electrical contact with the outer conductor 16 of the coaxial cable 10 via a tail 35 that is soldered to the outer conductor 16 at a solder joint 35a. The free end 34a of the outer conductor 34 is bevelled to facilitate insertion of the jack 130 (see FIG. 5). An annular dielectric spacer 36 is positioned between the central conductor extension 32 and the outer conductor extension 34 near the junction between the central conductor 12 and the central conductor extension 32. Another annular dielectric spacer 37 abuts the spacer 36 and maintains separation between the central conductor extension 32 and the outer conductor extension 34. The spacers 36, 37 position the outer conductor extension 34 to be spaced apart from and to circumferentially surround the central conductor extension 32. The central conductor extension 32 includes an annular recess 32b radially inwardly of the spacer 36 (see FIG. 7). The overmold body 40 surrounds the end of the cable 10 and the portion of the tail 35 that is soldered to the outer conductor 16.

Figure 7:
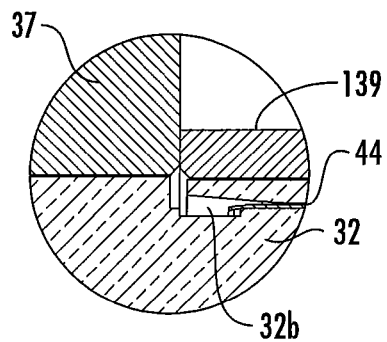
FIG. 7 is an enlarged partial section of the coaxial cable-connector assembly of FIG. 1.

As can be seen in FIG. 3, the post 32a of the central conductor extension 32 underlies a dielectric layer 44. In the illustrated embodiment, the dielectric layer 44 is formed of a polymeric shrink sleeve; in one example, the shrink sleeve may be formed of polyester or PTFE. The dielectric layer 44 is typically between about 0.001 and 0.003 inches in thickness. As can be seen in FIG. 7, the end portion of the sleeve comprising the dielectric layer 44 shrinks into the recess 32b, which helps to fix the dielectric layer 44 in place.

Figure 4:
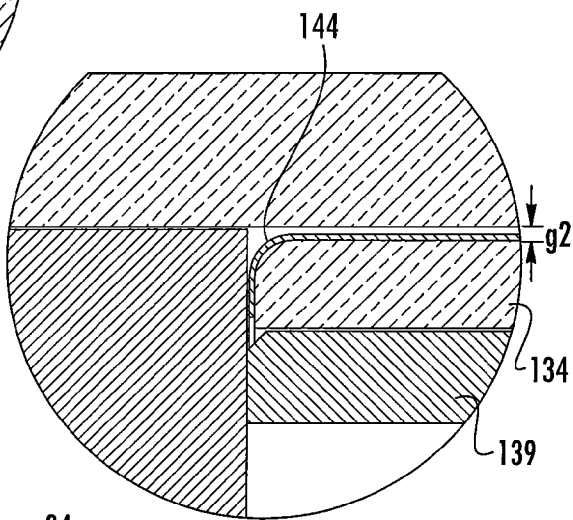
FIG. 4 is an enlarged partial section of the coaxial cable-connector assembly of FIG. 1.

Referring again to FIGS. 1 and 2, the jack 130 includes a central conductor extension 132, an outer conductor extension 134, and an overmold body 140. The central conductor extension 132 is mounted on and is in electrical contact with the central conductor 112 of the cable 110 via a boss 133. The central conductor extension 132 is hollow at its free end, forming a cavity 132a with a bevelled end 132b (see FIGS. 2 and 6). The outer conductor extension 134 is mounted in electrical contact with the outer conductor 116 of the coaxial cable 110 via a tail 135 that is soldered to the outer conductor 116 at a solder joint 135a. As can be seen in FIG. 4, the outer conductor extension 134 has a rounded edge at its free end. An annular dielectric spacer 136 is positioned between the central conductor extension 132 and the outer conductor extension 134 near the junction between the central conductor 112 and the central conductor extension 132. Another annular dielectric spacer 139 is located at the free ends of the central conductor extension 132 and the outer conductor extension 134 and maintains separation between the central conductor extension 132 and the outer conductor extension 134. The spacers 136, 139 position the outer conductor extension 134 to be spaced apart from and circumferentially surround the central conductor extension 132. The overmold body 140 surrounds the end of the cable 110 and the portion of the tail 135 that is soldered to the outer conductor 116. Also, an O-ring 142 is located within an annular recess 134a in the outer conductor extension 134 (see FIG. 5).

Figure 5:
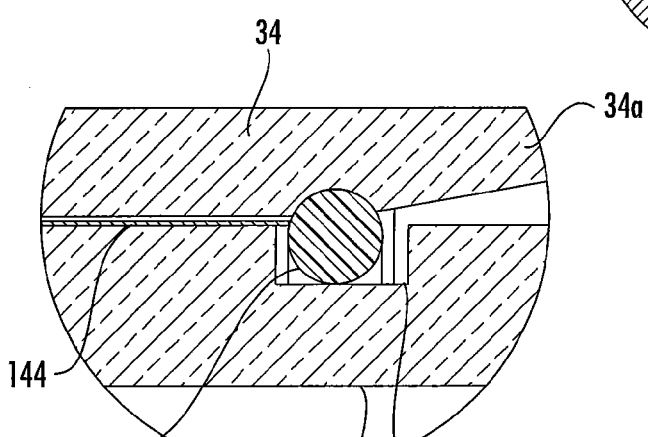
FIG. 5 is an enlarged partial section of the coaxial cable-connector assembly of FIG. 1.

A dielectric layer 144 overlies the outer conductor extension 134 (see FIGS. 4 and 5). Like the dielectric layer 44, in the illustrated embodiment, the dielectric layer 144 is formed of a polymeric shrink sleeve; in one example, the shrink sleeve may be formed of polyester or PTFE. The dielectric layer 144 is typically between about 0.001 and 0.003 inches in thickness. As can be seen in FIG. 5, the end portion of the sleeve comprising the dielectric layer 144 shrinks into the recess 134a, which helps to fix the dielectric layer 144 in place.

As shown in FIG. 1, the central conductor extension 32 and the outer conductor extension 34 of the plug 30 are configured to mate with the central conductor extension 132 and the outer conductor extension 134 of the jack 130. More specifically, the post 32a of the central conductor extension 32 of the plug 30 fits within the cavity 132a of the central conductor extension 132 of the jack 130, while the outer conductor extension 134 of the jack 130 fits within the walls of the partially overlying outer conductor extension 34 of the plug 30. The O-ring 142 is compressed radially inwardly by the outer conductor extension 34, thereby forming a watertight seal between the plug 30 and jack 130 (see FIG. 5).

FIG. 3 illustrates that, when the plug 30 and jack 130 are mated, a gap or cavity g1 is formed between the outer surface of the post 32a and the inner surface of the central conductor extension 132. In the illustrated embodiment, both the dielectric layer 44 and an air space are present in the gap g1, although in some embodiments the dielectric layer 44 fills the gap g1 entirely, and in other embodiments the gap g1 may have no explicit dielectric layer 44. The presence of the dielectric layer 44 and/or the air space electrically insulates the central conductor extension 32 of the plug 30 from the central conductor extension 132 of the jack 130, thereby forming a capacitive element between these components (see FIG. 3). The capacitive element so created can avoid the generation of PIM that can occur in interconnecting coaxial cables.

Similarly, and as can be seen in FIG. 4, a gap or cavity g2 is formed between the outer surface of the outer conductor extension 134 of the jack 130 and the inner surface of the outer conductor extension 34 of the plug 30. In the illustrated embodiment, both the dielectric layer 144 and an air space are present in the gap g2, although in some embodiments the dielectric layer 144 fills the gap g2 entirely, and in other embodiments the gap g2 may have no explicit dielectric layer 144. The presence of the dielectric layer 144 and/or the air space electrically insulates the outer conductor extension 134 of the jack 130 from the outer conductor extension 34 of the plug 30, thereby forming a capacitive element between these components that can avoid the generation of PIM.

In some embodiments, air space in the gap g1 and/or the gap g2 can provide a dampening effect during mating of the plug 30 and the jack 130. For example, if the air space in the gap g2 is between about 0.05 and 0.15 mm, air flow from the cavity of the plug 30 upon insertion of the jack 130 is sufficiently restricted that, as insertion proceeds, an air "cushion" is formed. In some prior connectors, and in particular blind-mated connectors (such as blind mated interfaces associated with heavy antennae/radio-heads, etc.) there is a danger of the interfaces slamming together and damaging connector parts, brackets, fasteners and the like. With a restricted air flow that creates a built-in air cushion, time is required to allow the air to leak out of the interface. This can produce a "soft" mating, which can eliminate the danger associated with components slamming together.

Figure 6:
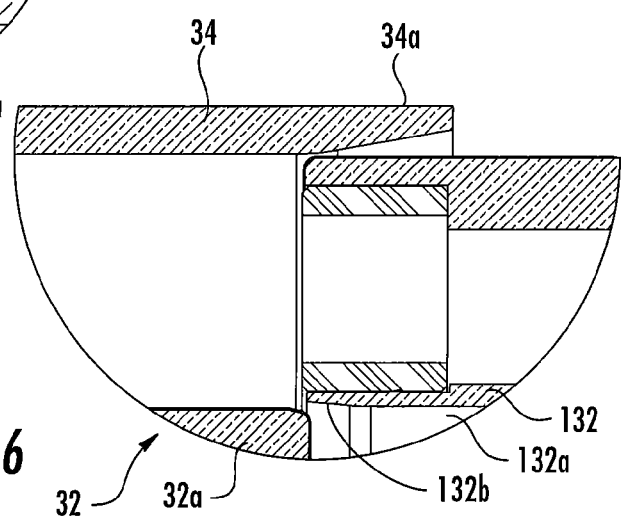
FIG. 6 is an enlarged partial section of the coaxial cable-connector assembly of FIG. 2.

As can be seen in FIG. 6, the rounded outer edge of the free end of the outer conductor extension 134 of the jack 130 can facilitate insertion of the outer conductor extension 134 within the outer conductor extension 34 of the plug 30. Insertion is also aided by the slight bevelling in the free end 34a of the outer conductor extension 34 of the plug 30 (see again FIG. 6). In a similar manner, and as shown in FIG. 3, the rounded edge of the free end of the post 32a of the central conductor extension 32 of the plug 30 can facilitate insertion of the central conductor extension 32 within the cavity 132a of the central conductor extension 132 of the jack 130.

Notably, and as can be seen in FIGS. 2 and 6, the outer conductor extension 34 extends farther away from the cable 10 (and deeper into the jack 130) than does the central conductor extension 32, such that, when the plug 30 and jack 130 are brought together to mate as in FIGS. 2 and 6, the outer conductor extension 134 of the jack 130 contacts and engages the outer conductor extension 34 prior to engagement of the central conductor extensions 32, 132. The bevelled end 34a of the outer conductor extension 34 tends to "center" the jack 130 relative to the plug 30, thereby facilitating engagement and mating of the central conductor extensions 32, 132. Engagement of the central conductor extensions 32, 132 is also facilitated by the bevelling of the end 132b of the central conductor extension 132 (see FIG. 6).

As shown in FIGS. 1 and 4, mating of the plug 30 and jack 130 is complete when the jack 130 "bottoms out" against the plug 30, which occurs when the spacer 139 of the jack 130 contacts the spacer 37 of the plug 30. As can be seen in FIG. 7, the spacer 139 extends slightly farther away from the cable 110 (and deeper into the plug 130) than does the central conductor extension 132, such that the central conductor extension 132 is prevented from contact and electrical connection with the central conductor 32, thereby preserving the capacitively coupled electrical connection created by the dielectric layer 44.

In addition to the materials discussed above, exemplary materials for the dielectric layers 44, 144 include other polymeric materials, ceramic materials, and glass. The dielectric strength of the materials of the dielectric layers 44, 144 is typically above about 8 MV/m. Although application as a shrink sleeve is illustrated and described herein, the dielectric layers 44, 144 may be applied in a number of different ways, including painting, spraying, sputter coating, or the like. In some embodiments, the capacitive element is sized and arranged so that it creates capacitance on the order of 10-50 pico farads between the central conductor extensions 32, 34 of the plug 30 and the respective conductor extensions 132, 134 of the jack 130.

Although the plug 30 and jack 130 are illustrated herein attached to free coaxial cables 10, 110, in some embodiments one of these connectors may be mounted within a structure, such as a shoulder plate such as that described in co-pending and co-assigned U.S. Patent Publication No. 2013/0065415, the disclosure of which is hereby incorporated herein by reference, that presents multiple connectors at once. Such a shoulder plate or similar mounting structure may be mounted on an antenna, remote radio head or the like.

It has been discovered that the geometry of the interface between the central conductor extensions 32, 132 and/or the outer conductor extensions 34, 134 (with the concentric gaps g1, g2) can dramatically affect the return loss of the mated plug-jack connection. Factors that may impact the return loss include the length of the overlap of the outer conductor extensions 34, 134 (also called gap length L2—see FIG. 1) and/or the overlap of the central conductor extensions 32, 132 (also called gap length L1—also shown in FIG. 1), the distance between the outer conductor extensions 34, 134 (i.e., the gap g2) and/or the inner conductor extensions 32, 132 (i.e., the gap g1) and the dielectric constant and thickness of the material(s) (including air) separating the outer conductor extensions 34, 134 and the central conductor extensions 32, 132. As shown in FIGS. 8-13 (explained in detail below), even relatively minor variations in these parameters may dramatically impact the return loss of the mated plug jack connection, and the impact is highly frequency dependent.

In many applications, coaxial cables and connectors are used in systems that carry radio frequency ("RF") signals that are within a known frequency range. For such systems, the return loss characteristics of the mated plug jack connection outside of the frequency range of interest may be of little concern. Accordingly, it may be possible to vary physical parameters of the mated plug jack connection such as the parameters identified above in order to "tune" the return loss characteristics of the mated connection to have improved return loss over the frequency band of interest. This typically results in some level of degradation to the return loss in other frequency ranges but, as noted above, this degradation may be of little or no concern if the mated plug-jack connection is to be used in a system that does not operate in those frequency bands.

As an example, typically minimizing the air space between the central conductor extensions and/or the outer conductor extensions can provide a broadband improvement in reflection by reducing the distance between the conductors, thus increasing the capacitance. This reduction in reflection improves return loss. Air gaps may be used when necessary or desirable to allow for ease of insertion given tolerances of the assembled parts.

In particular, the plug 30 and/or jack 130 may be configured such that the return loss of the assembly is below a preselected range (for example, below 24 or 30 dB) over a preselected frequency range (for example, between 600 MHz and 3.50 GHz). As noted above, parameters such as cavity length, outer conductor extension inner diameter, type of dielectric material, thickness of dielectric material, and/or thickness of the air space may provide an improved or optimized performance.

In some embodiments of the present invention, the mated plug-jack connection may be designed using conventional design techniques. Then, computer modeling may be used to vary parameters such as the length L2 of the overlap of the outer conductor extensions 34, 134, the gap g2 between the outer conductor extensions 34, 134 and the dielectric constant of the material separating the outer conductor extensions 34, 134 from the values for these parameters that are derived through the conventional design process. These parameters may be varied to provide a plurality of different connector designs and the return loss of the mated plug-jack connection may then be estimated using computer modeling techniques for each such connector designs. Hundreds, thousands or even tens of thousands of connector designs may be simulated to identify parameter sets that provide desired and/or acceptable return loss performance in a frequency band of interest.

While the above discussion has focused on improving return loss by improving or optimizing the physical parameters of the capacitive coupling interface between the outer conductor extensions 34, 134, it will be appreciated that the same techniques may be used to improve return loss by improving or optimizing the physical parameters of the capacitive coupling interface between the central conductor extensions 32, 132. Thus, it will be appreciated that the exact same techniques may be used to improve the return loss of the mated plug-jack connection by varying the physical parameters of the capacitive coupling interface between the central conductor extensions 32, 132, such as the length L1 of the overlap of the central conductor extensions 32, 132, the gap g1 between the central conductor extensions 32, 132 and the dielectric constant of the material separating the central conductor extensions 32, 132.

Figure 14:
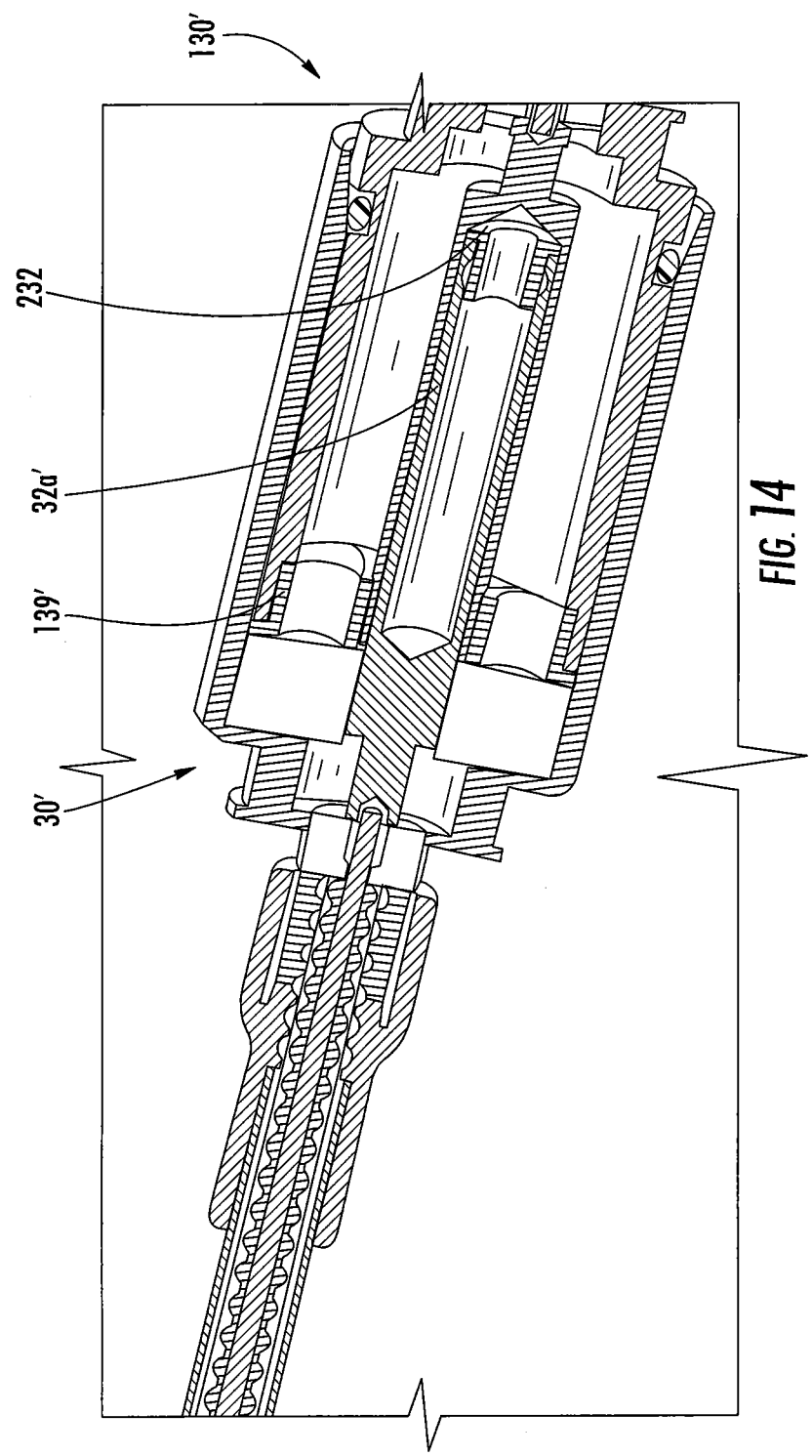
FIG. 14 is a perspective section view of a coaxial cable-connector assembly according to alternative embodiments of the invention, the assembly being shown in a mated condition.
Figure 15:
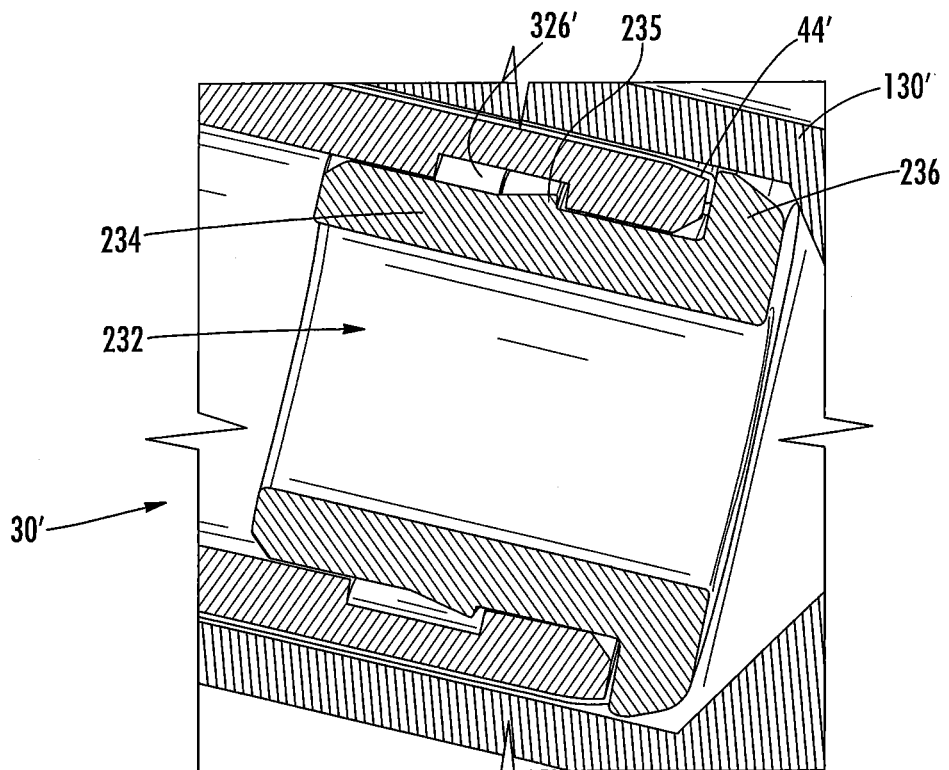
FIG. 15 is a greatly enlarged perspective section view of the dielectric cap in place in the assembly of FIG. 14.
Figure 16:
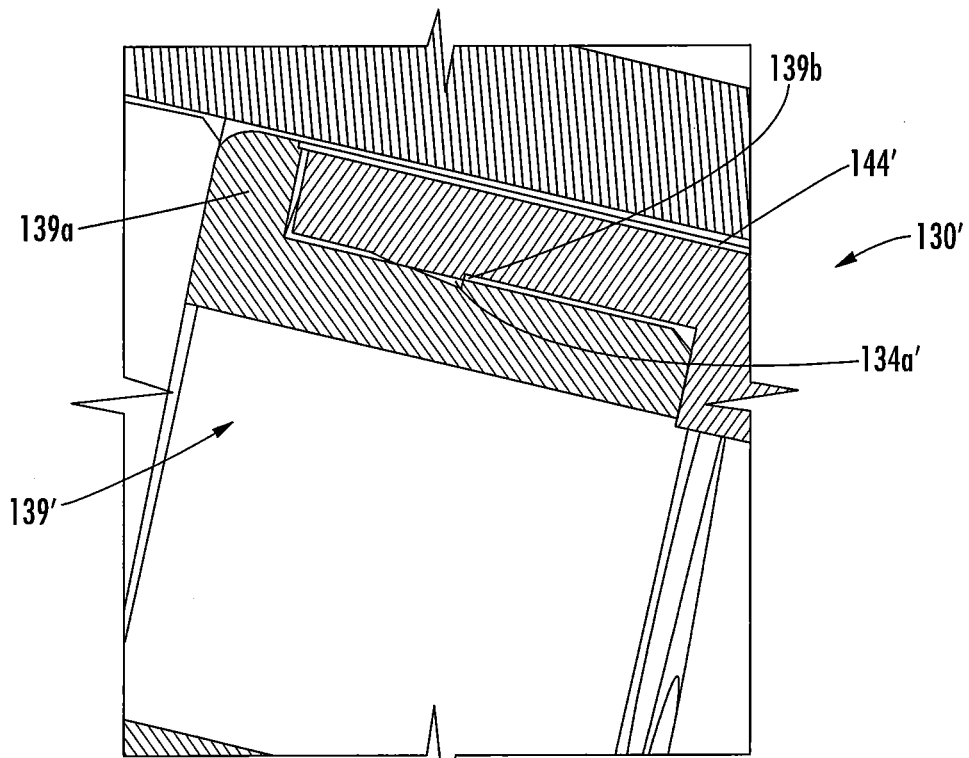
FIG. 16 is a greatly enlarged perspective view of the dielectric spacer in place in the assembly of FIG. 14.

Referring now to FIGS. 14-16, alternative embodiments of a plug, designated broadly at 30', and a jack, designated broadly at 130', are shown therein. The plug 30' is similar to the plug 30 with the exception that a dielectric cap 232 is mounted on the end of the post 32a'. As can be seen in FIG. 15, the cap 232 has a body 234 with a radially outwardly-extending flange 236. The body 234 fits within the post 32'; a nub 235 fits within a notch 32b' on the inner surface of the post 32a'. The flange 236 extends radially outwardly beyond the outer surface of the dielectric sleeve 44' mounted over the outer surface of the post 32a'. As such, the flange 236 can protect the sleeve 44' from contact with the central conductor extension 130' during mating of the plug 30' and jack 130'.

In a similar manner, and as shown in FIG. 16, the jack 130' resembles the jack 130 with the exception that the dielectric spacer 139' has a radially outwardly-extending flange 139a that extends beyond the outer surface of the dielectric sleeve 144'. A shoulder 139b on the spacer 139' fits within a notch 134a' in the outer conductor extension 134. Thus, the flange 139a can protect the sleeve 144' from contact with the outer conductor extension 34 during mating of the plug 30' and the jack 130'.

Embodiments of the invention are now described in greater detail in the following non-limiting examples, which are directed to investgation of the outer conductor extensions 34, 134.

EXAMPLES

Figure 8:
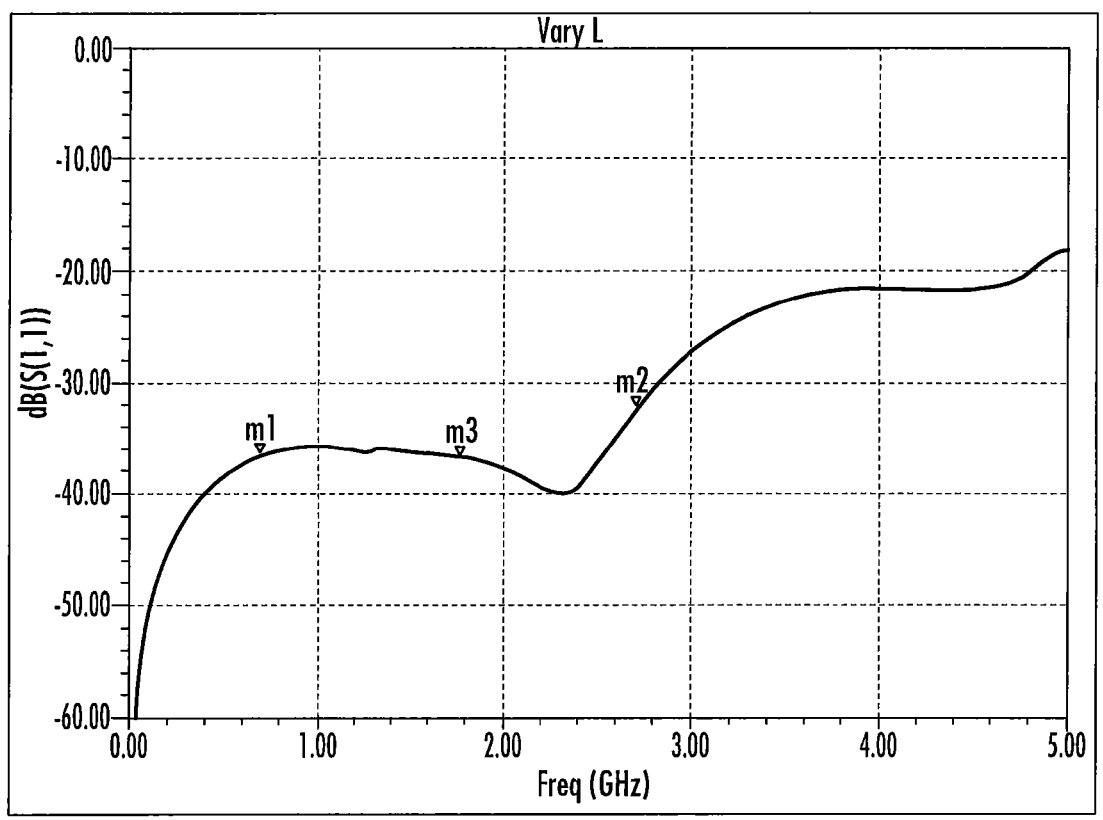
FIG. 8 is a graph plotting return loss as a function of frequency for an optimized connector design of FIG. 1 with the gap between the outer conductor extensions filled with conductive material.
Figure 9:
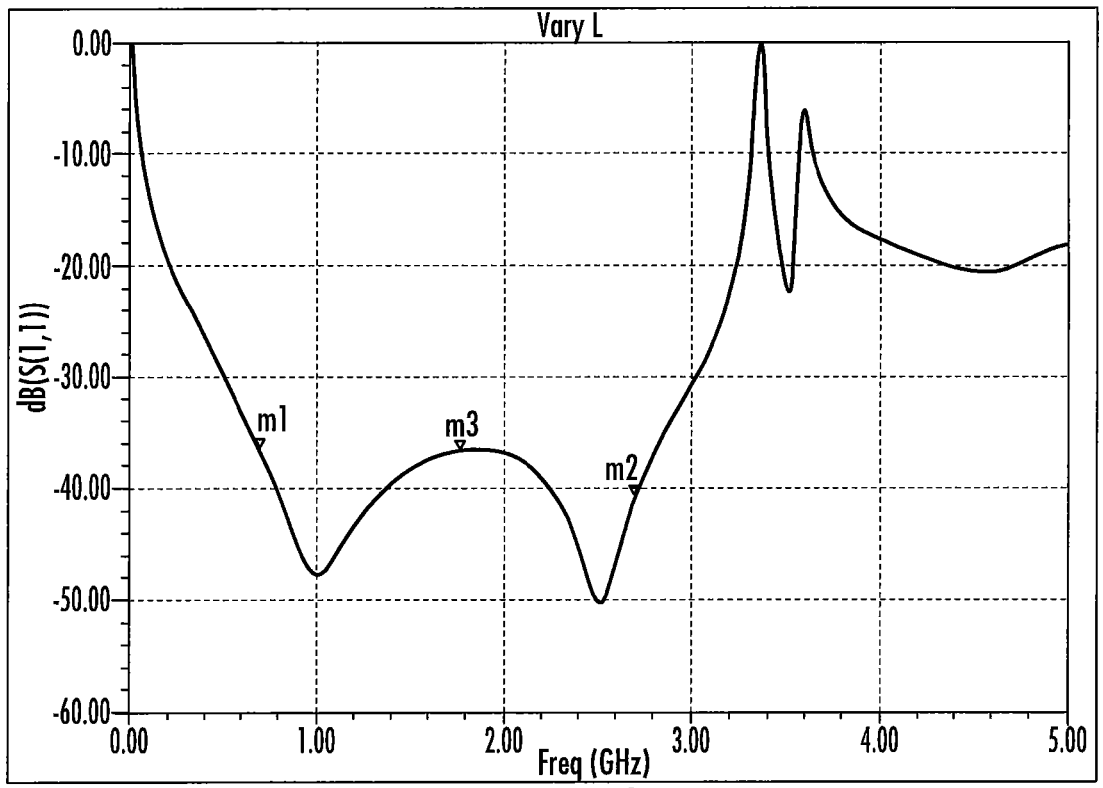
FIG. 9 is a graph plotting return loss as a function of frequency for the connector design of FIG. 8 with the gap between the outer conductor extensions unfilled.
Figure 10:
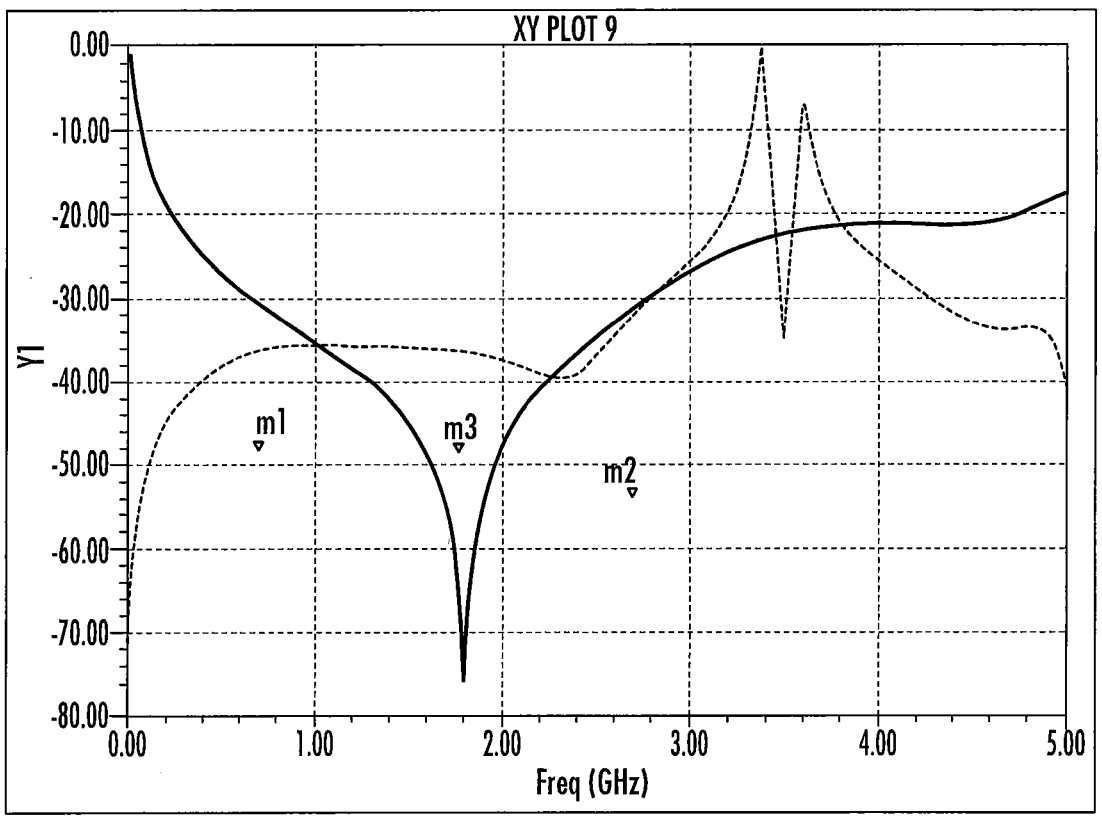
FIG. 10 is a graph plotting return loss as a function of frequency showing (a) the curve of FIG. 8 and (b) a curve representing the effect of the gap calculated from FIGS. 8 and 9.
Figure 11:
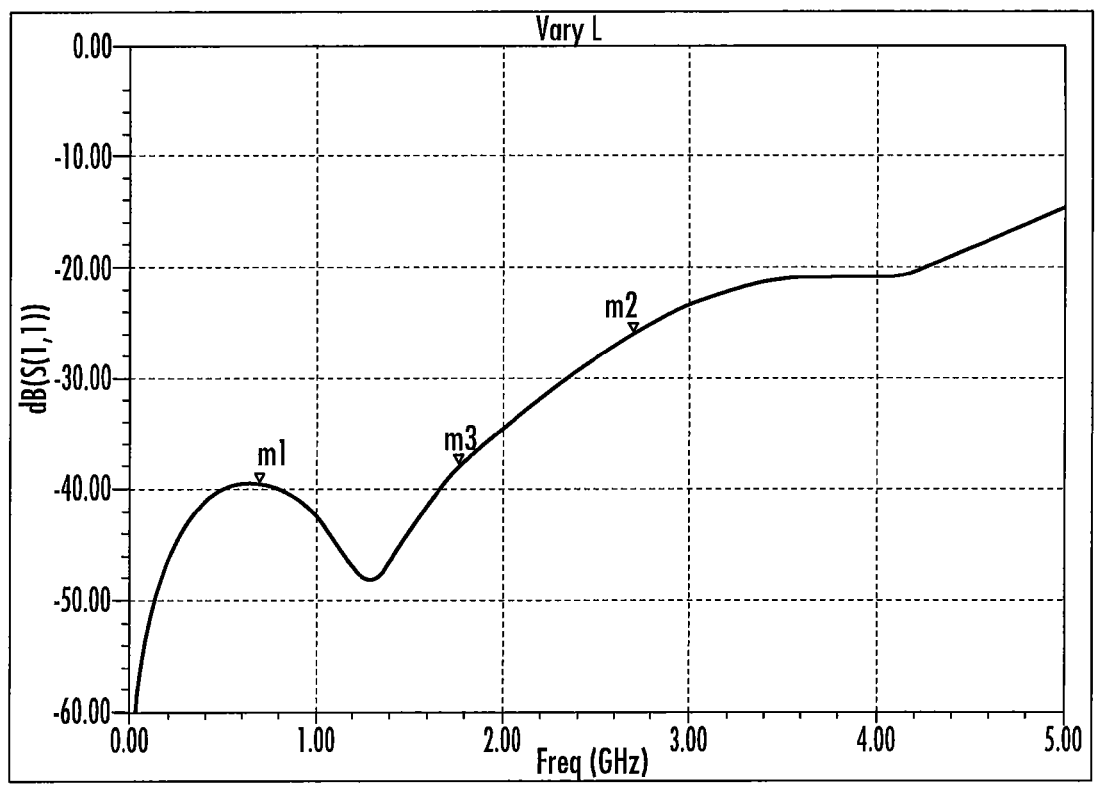
FIG. 11 is a graph plotting return loss as a function of frequency for a non-optimized connector design of FIG. 1 with the gap between the outer conductor extensions filled with conductive material.
Figure 12:
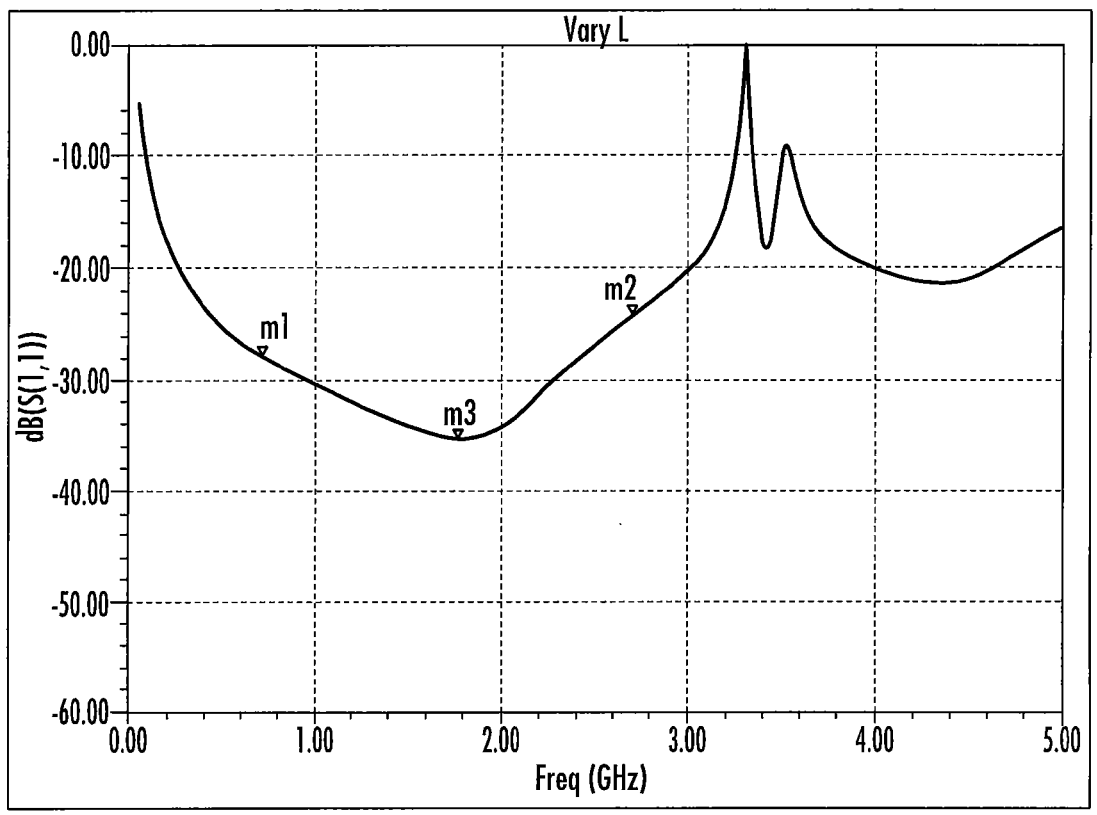
FIG. 12 is a graph plotting return loss as a function of frequency for the connector design of FIG. 11 with the gap between the outer conductor extensions unfilled.
Figure 13:
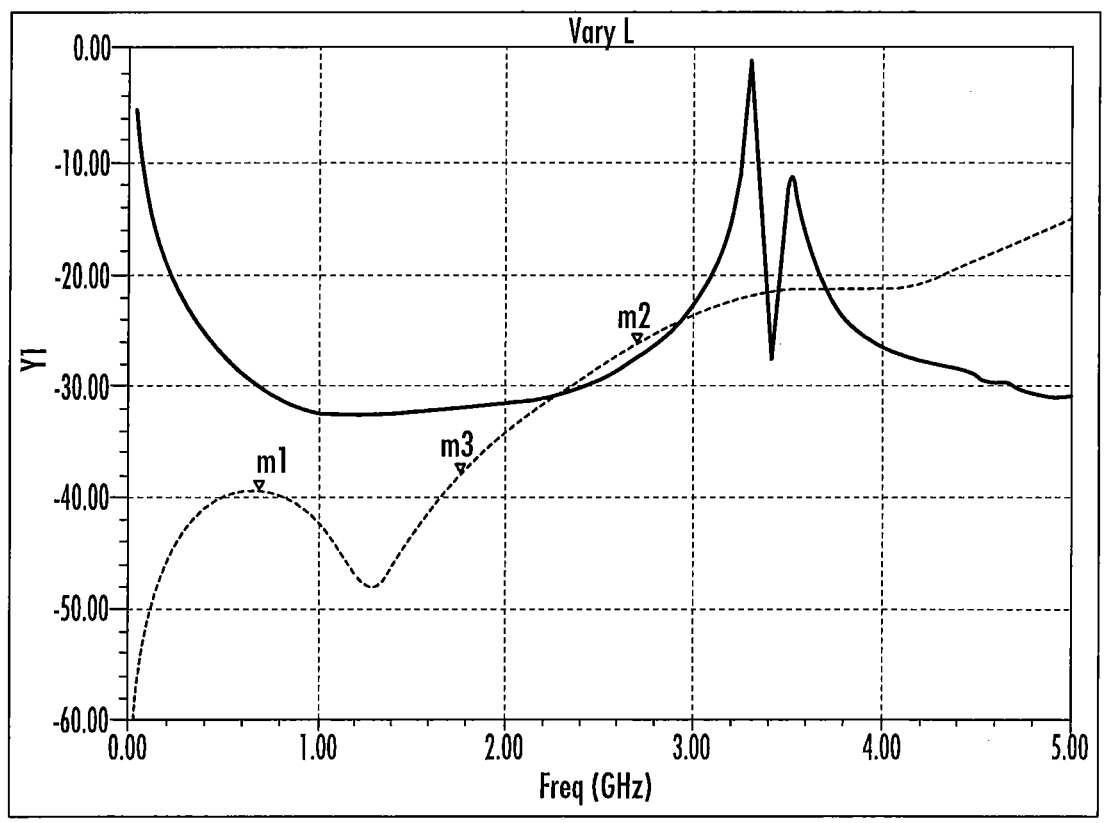
FIG. 13 is a graph plotting return loss as a function of frequency showing (a) the curve of FIG. 11 and (b) a curve representing the effect of the gap calculated from FIGS. 11 and 12.

The performance of the plug 30 and the jack 130 can be enhanced by varying the dimensions of the outer conductor extension 134 of the jack 130. FIGS. 8-13 are graphs plotting the return loss of two differently dimensioned plug jack combinations that follow the general structure of FIGS. 1-7 as a function of frequency. FIGS. 8-10 relate to a jack 130 (designated Jack A for the purpose of discussion) with an outer conductor extension 134 having an inner diameter A of 23 mm. FIGS. 11-13 relate to a jack 130 (designated Jack B) with an outer conductor extension having an inner diameter A of 22.5 mm.

FIGS. 8 and 11 plot return loss as a function of frequency for plug jack combinations in which the gap g2 between the outer conductor extensions 34, 134 is shorted (via aluminium tape that fills the gap g2). Comparing these two figures, it can be seen that, between markers m1 and m2, the curve of FIG. 11 (showing Jack B) has a much lower return loss at m1 and a generally lower return loss between m1 and m3 than does the curve of FIG. 8 (showing Jack A), with only the portion of the curve of FIG. 11 between m3 and m2 having a higher return loss than the curve of FIG. 8.

FIGS. 9 and 12 plot return loss as a function of frequency for plug-jack combinations in which the gap g2 is present. Surprisingly, the curve of FIG. 9 (showing Jack A) shows a much lower return loss (below −35 dB between markers m1 and m2) than does the curve of FIG. 12 (showing Jack B), which is only below −26 dB between markers m1 and m2).

FIG. 10 shows, for Jack A, the curve of FIG. 8 (representing the structure with no gap g2) and a curve for the gap g2 itself (calculated by subtracting the curve of FIG. 8 from the curve of FIG. 9). Similarly, FIG. 13 shows, for Jack B, the curve of FIG. 11 (representing the structure with no gap g2) and a curve for the gap g2 itself (calculated by subtracting the curve of FIG. 11 from the curve of FIG. 12). It can be seen that the positive effect of the gap g2 on return loss is much greater for Jack A than for Jack B. As discussed above, similar modifications can be made for the central conductor extensions 32, 132 and the gap g1.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A coaxial connector junction, comprising:
    (a) a first coaxial connector, comprising:
        a first central conductor extension comprising a substantially cylindrical member;
        a first outer conductor extension spaced apart from and circumferentially surrounding the first central conductor extension; and
        a first dielectric spacer interposed between the first central conductor extension and the first outer conductor extension;
    (b) a second coaxial connector, comprising:
        a second central conductor extension, the second central conductor extension including a substantially cylindrical cavity therein;
        a second outer conductor extension spaced apart from and circumferentially surrounding the second central conductor extension; and
        a second dielectric spacer interposed between the second central conductor extension and the second outer conductor extension;
    wherein the first coaxial connector engages the second coaxial connector, the substantially cylindrical member of the first central conductor extension being inserted into the cavity of the second central conductor extension, and the second outer conductor extension being inserted into the first outer conductor extension such that a capacitive element is created between the first and second outer conductor extensions by a gap between the first outer conductor extension and the second outer conductor extension; and
    wherein at least one of a length of the gap, an inner diameter of the second outer conductor extension, a thickness of the capacitive element, and the dielectric constant of the capacitive element is selected such that the return loss of the connector junction is maintained below a preselected level over a preselected frequency range.

2. The coaxial connector junction defined in claim 1, wherein the preselected level of return loss is about 30 dB.

3. The coaxial connector junction defined in claim 1, wherein the preselected frequency range is between about 600 Mhz and 3.50 GHz.

4. The coaxial connector junction defined in claim 1, wherein the inner diameter of the second outer conductor extension is selected such that the return loss of the connector junction is maintained below the preselected level over the preselected frequency range.

5. The coaxial connector junction defined in claim 1, wherein the at least one of the length of the gap, the inner diameter of the second outer conductor extension, the thickness of the capacitive element, and the dielectric constant of the capacitive element is selected such that the effect of the presence of the capacitive element alone reduces the return loss in an upper portion of the preselected frequency range.

6. A method of improving the return loss of a coaxial connector junction, comprising the steps of:
    (a) providing first and second coaxial connectors, the first coaxial connector comprising:
        (i) a first central conductor extension comprising a substantially cylindrical member;
        (ii) a first outer conductor extension spaced apart from and circumferentially surrounding the first central conductor extension; and
        (iii) a first dielectric spacer interposed between the first central conductor extension and the first outer conductor extension; and
    the second coaxial connector comprising:
        (iv) a second central conductor extension, the second central conductor extension including a substantially cylindrical cavity therein;
        (v) a second outer conductor extension spaced apart from and circumferentially surrounding the second central conductor extension; and
        (vi) a second dielectric spacer interposed between the second central conductor extension and the second outer conductor extension;
    wherein the first coaxial connector engages the second coaxial connector, the substantially cylindrical member of the first central conductor extension being inserted into the cavity of the second central conductor extension, and the second outer conductor extension being inserted into the first outer conductor extension such that a capacitive element is created between the first and second outer conductor extensions by a gap between the first outer conductor extension and the second outer conductor extension; and (b) adjusting at least one of a length of the gap, an inner diameter of the second outer conductor extension, a thickness of the capacitive element, and the dielectric constant of the capacitive element such that the return loss of the connector junction is maintained below a preselected level over a preselected frequency range.

7. The method defined in claim 6, wherein the preselected level of return loss is about 30 dB.

8. The method defined in claim 6, wherein the preselected frequency range is between about 696 MHz and 2.70 GHz.

9. The method defined in claim 6, wherein the inner diameter of the second outer conductor extension is selected such that the return loss of the connector junction is maintained below the preselected level over the preselected frequency range.

10. The method defined in claim 6, wherein the at least one of the inner diameter of the second outer conductor extension, the thickness of the capacitive element, and the dielectric constant of the capacitive element is selected such that the effect of the presence of the capacitive element alone reduces the return loss in an upper portion of the preselected frequency range.

11. A coaxial connector junction, comprising:
(a) a first coaxial connector, comprising:
a first central conductor extension comprising a substantially cylindrical member;
a first outer conductor extension spaced apart from and circumferentially surrounding the first central conductor extension; and
a first dielectric spacer interposed between the first central conductor extension and the first outer conductor extension;
(b) a second coaxial connector, comprising:
a second central conductor extension, the second central conductor extension including a substantially cylindrical cavity therein;
a second outer conductor extension spaced apart from and circumferentially surrounding the second central conductor extension; and
a second dielectric spacer interposed between the second central conductor extension and the second outer conductor extension;
wherein the first coaxial connector engages the second coaxial connector, the substantially cylindrical member of the first central conductor extension being inserted into the cavity of the second central conductor extension, and the second outer conductor extension being inserted into the first outer conductor extension such that a capacitive element is created between the first and second central conductor extensions by a gap between the first central conductor extension and the second central conductor extension; and
wherein at least one of a length of the gap, an inner diameter of the second central conductor extension, a thickness of the capacitive element, and the dielectric constant of the capacitive element is selected such that the return loss of the connector junction is maintained below a preselected level over a preselected frequency range.

12. The coaxial connector junction defined in claim 11, wherein the preselected level of return loss is about 30 dB.

13. The coaxial connector junction defined in claim 11, wherein the preselected frequency range is between about 600 Mhz and 3.50 GHz.

14. The coaxial connector junction defined in claim 11, wherein the inner diameter of the second central conductor extension is selected such that the return loss of the connector junction is maintained below the preselected level over the preselected frequency range.

15. The coaxial connector junction defined in claim 11, wherein the at least one of the length of the gap, the inner diameter of the second central conductor extension, the thickness of the capacitive element, and the dielectric constant of the capacitive element is selected such that the effect of the presence of the capacitive element alone reduces the return loss in an upper portion of the preselected frequency range.

16. A method of improving the return loss of a coaxial connector junction, comprising the steps of:
(a) providing first and second coaxial connectors, the first coaxial connector comprising:
(i) a first central conductor extension comprising a substantially cylindrical member;
(ii) a first outer conductor extension spaced apart from and circumferentially surrounding the first central conductor extension; and
(iii) a first dielectric spacer interposed between the first central conductor extension and the first outer conductor extension; and
the second coaxial connector comprising:
(iv) a second central conductor extension, the second central conductor extension including a substantially cylindrical cavity therein;
(v) a second outer conductor extension spaced apart from and circumferentially surrounding the second central conductor extension; and
(vi) a second dielectric spacer interposed between the second central conductor extension and the second outer conductor extension;
wherein the first coaxial connector engages the second coaxial connector, the substantially cylindrical member of the first central conductor extension being inserted into the cavity of the second central conductor extension, and the second outer conductor extension being inserted into the first outer conductor extension such that a capacitive element is created between the first and second central conductor extensions by a gap between the first central conductor extension and the second central conductor extension; and
(b) adjusting at least one of a length of the gap, an inner diameter of the second central conductor extension, a thickness of the capacitive element, and the dielectric constant of the capacitive element such that the return loss of the connector junction is maintained below a preselected level over a preselected frequency range.

17. The method defined in claim 16, wherein the preselected level of return loss is about 30 dB.

18. The method defined in claim 16, wherein the preselected frequency range is between about 696 MHz and 2.70 GHz.

19. The method defined in claim 16, wherein the inner diameter of the second central conductor extension is selected such that the return loss of the connector junction is maintained below the preselected level over the preselected frequency range.

20. The method defined in claim 16, wherein the at least one of the length of the gap, the inner diameter of the second central conductor extension, the thickness of the capacitive element, and the dielectric constant of the capacitive element is selected such that the effect of the presence of the capacitive element alone reduces the return loss in an upper portion of the preselected frequency range.

21. A coaxial connector junction, comprising:
(a) a first coaxial connector, comprising:
a first central conductor extension comprising a substantially cylindrical member;
a first outer conductor extension spaced apart from and circumferentially surrounding the first central conductor extension; and
a first dielectric spacer interposed between the first central conductor extension and the first outer conductor extension;
(b) a second coaxial connector, comprising:
a second central conductor extension, the second central conductor extension including a substantially cylindrical cavity therein;
a second outer conductor extension spaced apart from and circumferentially surrounding the second central conductor extension; and
a second dielectric spacer interposed between the second central conductor extension and the second outer conductor extension;
wherein the first coaxial connector engages the second coaxial connector, the substantially cylindrical member of the first central conductor extension being inserted into the cavity of the second central conductor extension, and the second outer conductor extension being inserted into the first outer conductor extension such that a capacitive element is created between the first and second outer conductor extensions by a gap between the first outer conductor extension and the second outer conductor extension;
wherein the capacitive element in the gap comprises a dielectric layer applied on the second outer conductor extension; and
wherein the second dielectric spacer includes a flange that extends radially outward toward to protect the dielectric layer of the capacitive element.

22. A coaxial connector junction, comprising:
(a) a first coaxial connector, comprising:
a first central conductor extension comprising a substantially cylindrical member;
a first outer conductor extension spaced apart from and circumferentially surrounding the first central conductor extension; and
a first dielectric spacer interposed between the first central conductor extension and the first outer conductor extension;
(b) a second coaxial connector, comprising:
a second central conductor extension, the second central conductor extension including a substantially cylindrical cavity therein;
a second outer conductor extension spaced apart from and circumferentially surrounding the second central conductor extension; and
a second dielectric spacer interposed between the second central conductor extension and the second outer conductor extension;
wherein the first coaxial connector engages the second coaxial connector, the substantially cylindrical member of the first central conductor extension being inserted into the cavity of the second central conductor extension, and the second outer conductor extension being inserted into the first outer conductor extension such that a capacitive element is created between the first and second central conductor extensions by a gap between the first central conductor extension and the second central conductor extension;
wherein the capacitive element in the gap comprises a dielectric layer applied on the first central conductor extension; and
further comprising a dielectric cap mounted to a free end of the first central conductor extension, the dielectric cap includes a flange that extends radially outward toward to protect the dielectric layer of the capacitive element.

* * * * *